March 31, 1931. J. A. OBERMAIER 1,798,896
SWITCH
Filed Dec. 9, 1927 2 Sheets-Sheet 1
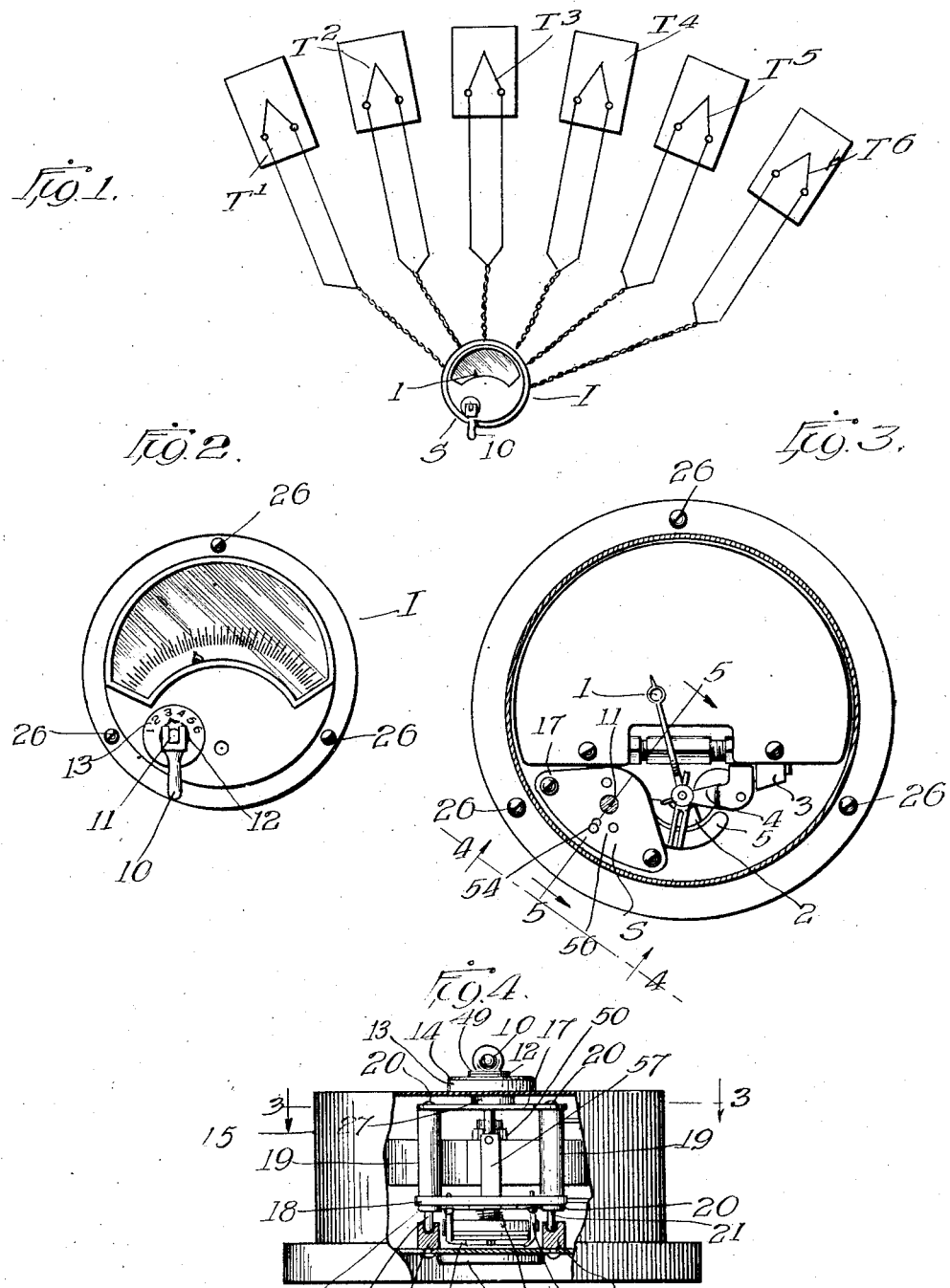

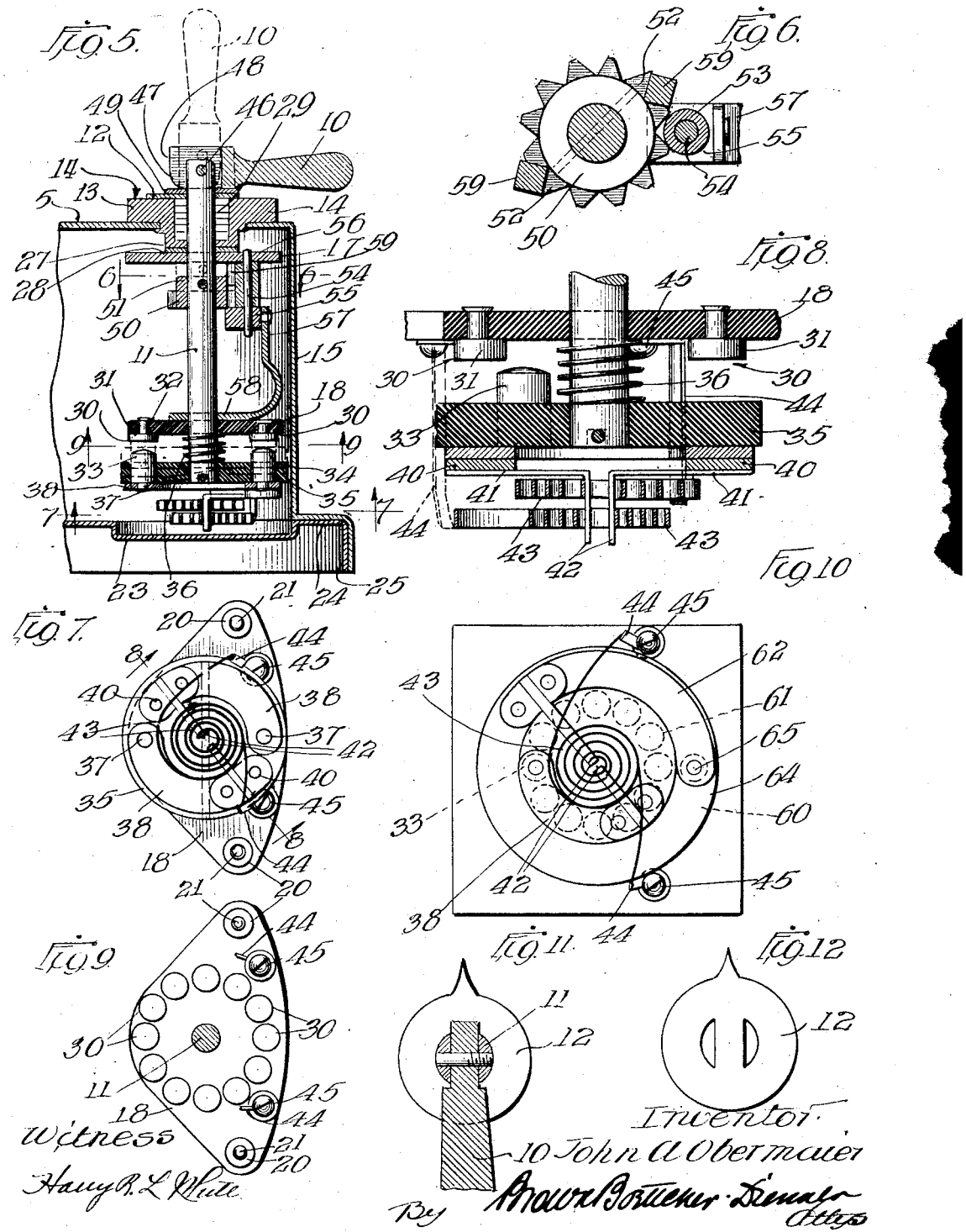

Patented Mar. 31, 1931

1,798,896

UNITED STATES PATENT OFFICE

JOHN A. OBERMAIER, OF CHICAGO, ILLINOIS

SWITCH

Application filed December 9, 1927. Serial No. 238,738.

My present invention relates to electrical measuring instruments for measuring the characteristics of a plurality of circuits, and is more particularly concerned with the switch for switching the measuring instrument from one circuit to another and the mounting of the switch either in the case of the instrument or in a separate case.

In the specific embodiment herein shown and described, a millivolt meter is arranged to be connected to a plurality of pyrometer circuits by a selector switch. The meter is graduated in terms of temperature or any variable which is a function of the same. I employ an instrument of relatively low resistance, i. e., of the order of 10 to 50 ohms. The pyrometer elements may give a potential up to 50 millivolts. Now it may be seen that if any change of resistance in the instrument circuit is caused by variations of contact resistance in the selector switch, the accuracy of the indication is lost.

I have experimented with various forms of switches now known and find that a wiping contact is not satisfactory, as it changes its resistance due to wear in use. The rubbing of the parts changes the surface contact. When the parts are of copper or the like, the metal surfaces tend to score and become rough. The result is that the contact resistance does not remain constant. The absolute value of the contact resistance is immaterial, so long as it is constant. Such wearing of the metal parts also produces a powdered metal which deposits between contacts and may shunt or short circuit some of the circuits.

Systems of this kind, i. e., pyrometer systems wherein a pluraity of pyrometer elements are mounted in different locations and arranged to be read from a common instrument are now employed in many different situations. For example, in checking the operation of Diesel engines, it is now the practice to insert a pyrometer thermocouple in the exhaust of each cylinder to determine the relative work done by the cylinders and the efficiency of combustion. In such case it is common to have the instrument graduated directly in horsepower. When so employed, it is customary to take a reading of each circuit every fifteen minutes. This means a large number of operations of the selector switch.

There are numerous other situations where such plurality of circuits are employed as, for example, in multideck baking ovens, heat treating furnaces and the like.

In the production of the present switch, I have aimed to meet the requirements of a definite constant contact resistance and of such a design as to be small enough to go into the instrument case.

In order to secure the desired constant contact resistance, I have eliminated wiping or hammering of the contacts. I provide means for separating the contacts by a lifting action and engaging them by an abutting contact which is thereafter put under relatively heavy pressure, as by a cam or toggle action. When so engaged, the contacts are held against any relative rotary motion by an indexing mechanism which thereby prevents wear.

The specific mechanism which I shall describe secures a slight rolling action after the contacts are once engaged, which rolling action is enough to insure cutting of any possible film on the surfaces, with a minimum of wear. This specific form of contact may be varied.

Also I provide an improved mounting for the selector switch in the instrument case to make a convenient assembly and to arrange the mounting of the switch to free the instrument from disarrangement or stress due to operation of the switch.

Numerous other features of improvement will be apparent from the following detailed description and drawings.

In order to acquaint those skilled in the art with the manner of constructing and operating a device embodying my invention, I shall describe in connection with the accompanying drawings a specific embodiment of my invention.

Fig. 1 is a plan view, partly diagrammatic, of a system employing my invention;

Fig. 2 is a front elevational view of the metering instrument having a switch of my invention embodied therein;

Fig. 3 is a section taken on the line 3—3 of

Fig. 4 showing the metering element and part of the switch in elevation;

Fig. 4 is a view taken on the line 4—4 of Fig. 3 with the casing broken away to reveal the switch and its mounting inside of the casing;

Fig. 5 is an enlarged sectional view taken on the line 5—5 of Fig. 3;

Fig. 6 is a transverse section through the switch taken on the line 6—6 of Fig. 5;

Fig. 7 is a rear elevational view of the switch as seen on the line 7—7 of Fig. 5;

Fig. 8 is a cross-sectional fragmentary view taken on the line 8—8 of Fig. 7;

Fig. 9 is a cross-sectional view taken on the line 9—9 of Fig. 5;

Fig. 10 is an end view of a modified form of the switch;

Fig. 11 is a fragmentary sectional view of a modified form of mounting the switch handle; and Fig. 12 is a plan view of a pointer secured to the shaft shown in Fig. 11.

Referring to Fig. 1, I have shown a series of six thermocouples T1 to T6, inclusive, such as might, for example, be disposed in the proper relation to six Diesel engine cylinders, each of these thermocouples having a separate circuit terminating in suitable terminals within the indicating instrument I on the selector switch S.

The instrument I is a millivolt meter graduated in suitable terms, dependent upon what it is desired to ascertain from the action of the thermocouples.

The indicating instrument I has a movable indicating pointer 1 actuated by a suitable coil 2 which is adapted through the selector switch S to be connected to the circuit of the thermocouples, such as T1.

The features of construction of the indicating instrument I are not important in the present invention, except as they permit the selector switch S to be suitably embodied within the same case or other suitable convenient relationship to the instrument.

As I have heretofore indicated, the resistance of the coil 2 in the indicating instrument I is relatively low and, hence, any change in resistance in the switch would entail a larger percentage variation in the accuracy of the instrument.

The instrument I includes the permanent magnet 3 having pole pieces 4 and 5 all constructed in accordance with my Patent No. 1,597,327, August 24, 1927.

The selector switch S has an operating handle 10 mounted on a shaft 11 and provided with a suitable pointer 12 playing over the chart 13, which chart is, in reality, suitable numbers or other symbols stamped on the face 13 of the flanged bushing 13 and secured in the top wall of the case 15.

The shaft 11 is supported in the switch frame, which is constructed of an upper frame plate 17, preferably of metal, and a lower frame plate 18, preferably of insulating material. These frame plates are connected together by posts or pillars 19—19, suitable screws 20—20 passing through the top frame plate 17 and being threaded into the posts 19—19 at the upper end. The posts 19—19 may be threaded into the lower frame plate 18, or the said frame plate may be clamped against shoulders on the pillars 19—19 as by clamping nuts 20—20, said pillars 19—19 having reduced ends forming pins 21—21 seating in sockets formed in the blocks 22—22 secured to the bottom or base plate 23 of the indicating instrument.

The bottom or frame plate 23 of the indicating instrument has an extending flange 24 terminating in a cylindrical wall 25, and the case or cover 15 has a cooperating flange closely fitting the walls 24 and 25 of the base plate so as to secure the cover in substantially a dust proof manner to the base plate. Suitable screws, shown at 26, pass through the flange of the cover and are threaded into the wall 24 of the base plate to hold these parts together.

The shaft 11 passes through the boss or hub 27 of the bushing 14 and if desired, a spacing washer 28 lies between said boss and the top frame plate 17 of the switch. The bushing 14 preferably contains a packing material 29 disposed in a suitable recess so as to provide a dust and moisture proof packing for the shaft.

It will now be seen that the switch S has a three point suspension in the case, i. e., one point of suspension on the shaft 11 where it passes through the bushing 13, and the other two points of suspension being on the pins 21—21 in the sockets in the blocks 22 and 23. In this way the switch is held in the case and on the base plate relatively loosely, so that in assembling the instrument no stresses can be put upon the base plate and cover and thus disturb the indicating instrument I and frictionless operation of the switch. Also, the assembly may be made in units, that is, the indicating instrument may be made up and assembled as one unit and the switch as a separate unit. This also facilitates inspection or repair of the switch without tearing down the instrument.

The shaft 11 has two proper motions, one a rotary motion or selecting motion to select the circuit, and the second motion is an axial motion to close the circuit with the selecting contacts.

The contacts are mounted on the insulating plate 18 in pairs, the pairs being disposed at opposite ends of a diameter, passing through the shaft 11. Thus, in Fig. 5 contacts 30—30 constitute a pair which are connected to the circuit of one of the thermocouples such as T1.

I have shown six sets of contacts thus arranged to provide terminals for the six thermocouple circuits although there is no limit to the number that may be employed.

These contacts are formed as shown in Fig. 5, constituting head portions 31 and shanks 32 passing through holes in the insulating plate 18 and being riveted at the back to hold a contact firmly in position. The terminals of the circuits are soldered to the riveted ends of the shanks 32 on the back side of the plate 18.

The terminals of the instrument coil 2 are connected to a pair of movable contact members 33—34 mounted in a supporting member 35, which comprises a plate of insulating material, such, for example, as bakelized fiber or cloth. These contacts 33—34 comprise relatively short cylindrical pins projecting through holes in the movable plate 35 and having rounded ends adapted to abut with the heads 31 of the contacts such as 30—30.

The plate 35 is pinned or otherwise secured to the end of the shaft 11, as shown in Fig. 5, and the plate 35 and shaft 11 are urged downwardly, as viewed in Fig. 5, by a compression spring 36 interposed between the plate 35 and the insulating frame plate 18 and embracing the shaft 11. The spring 36 might be disposed at any other suitable point, for example between frame plate 17 and star wheel 50.

The movable pins 33 have rounded ends adapted to be brought into abutting contact with the head 31 of the pins 30. On the lower side of the plate 35 the pins 33 have reduced studs 37 which extend through springs 38 and are there riveted in place.

The springs 38 are of curved form adapted to lie along the edges of the plate 35 to carry the pins 33 at diametrically opposite points in the plate 35 free to slide in the plate 35 and yet held under suitable spring pressure. The ends of the springs 38 are anchored under clamping plates 40—40, these clamping plates being held preferably by screws passing through the insulating plates 35.

L-shaped brackets 41—41 extend from the clamping plates toward the center of the movable frame plate 35, the ends 42—42 extending in axial parallel relation, as shown in Fig. 6. To these ends 42—42 spiral conducting rivets 43—43 are connected, and the outer ends of the spiral conducting rivets 43—43 are anchored to conducting brackets 44—44, the bases of the brackets being held by the screws 45—45 threaded into the stationary frame plate 18. The terminals of the coil 2 are suitably connected to the screws 45, or to the brackets 44.

The shaft 11 is adapted to be moved endwise by means of the handle 10, this handle being pinned at 46 to the end of the shaft, and the lower end of the handle where it is pivoted to the shaft being provided with a cam surface 47 and a square end 48. An antifriction plate or washer 49 may be disposed immediately under the handle member 10 to take the thrust imposed by the cam action along said handle.

The washer 49 is loose on the shaft 11, but the pointer member 12 is fastened thereto.

Whereas, in Figs. 1, 2 and 5, I have shown the end of the shaft 11 as flattened or slabbed off at the sides and the handle 10 forked to embrace the same, the handle 10 may be slabbed off at the sides and the shaft forked as shown in Fig. 11. In that event the pointer 12 is formed of a corresponding configuration as shown in Fig. 12.

Now, in order to prevent accidental wiping contact of the pins 33—34 with the contacts 30—30 and the like, I provide an indexing mechanism and registering mechanism for first registering the contacts 33—34 with a particular pair of the contacts 30—30 and then lock the shaft 11 against rotary motion as soon as it starts endwise motion. For the purpose of registering the movable contacts 33—34, I provide a star wheel 50 which has a hub 51 pinned to the shaft 11, as shown in Fig. 5. This star wheel has two teeth 52—52 at opposite ends of a diameter forming stops for the rotary motion of the shaft 11.

A spring pressed roller 53 is adapted to spring into the notches between the teeth on the star wheel 50 so as to register the contacts 33—34 accurately with the stationary contacts 30—30. The roller 53 is held on a pin 54, this pin at its outer end extending into a slot 56 in the frame plate 17 and at its inner end being mounted relatively fixedly in the bearing block 55. The block 55 in turn is secured to the upper end of a spring 57, which spring is bowed and is provided with a lower securing base 58 which is secured to the insulating frame plate 18 as shown in Fig. 5. Now it can be seen that with the handle in full line position as shown in Fig. 5, the shaft 11 may be turned and the registering mechanism will accurately register the movable contacts 33—34 with a stationary contact such as 30—30. The teeth 52—52 which are longer than the other teeth on the star wheel 50, will not pass under the roller 53, since it is limited in its outward motion by the limited play of the pin 54 in the slot 56.

To interlock the shaft 11 against rotary motion and to index the shaft accurately, I provide a pair of indexing pins or posts 59—59. These posts are provided with extending pins riveted into the upper frame plate 17.

Now it can be seen that the endwise motion of the shaft 11 moves the star wheel 50 with it, and the post or pins 59—59 enter the notches between adjacent teeth of the star wheel so as to prevent rotary motion after endwise motion has once begun.

Now, I wish to call attention to the manner in which the pins 33—34 make contact with the stationary contact 30. The ends of these pins 33—34 are rounded and the pins 33—34 are relatively loose in the plate 35. When the plate 35 is drawn towards the stationary frame plate 18, these pins, which are mounted in the curved spring 38—38 have a relatively outward motion with respect to the movable plate 35 and, at the same time, have a slight angular motion due to the bending of the spring 38—38. The result is, that the very slight angular motion which they have, tends to give a wiping action of small extent but of great effectiveness. This tends to cut any film which might be found on any of the contacting parts.

The springs 38—38 are made relatively stiff and with the cam action of the handle 10 a very considerable pressure is secured between the movable and stationary contacts. The handle 10 is adapted to remain in raised position, as shown in dotted lines in Fig. 5 if so desired.

The operation of the device is, briefly, as follows:

With the instrument as shown connected in Fig. 1, the handle member 10 is moved to bring the pointer 12 into register with the points on the card 13. A definite click action is secured by the roller 53 on the spring 57 so that the pointer is easily registered with the desired point on the card. Then the handle 10 is swung into line with the shaft 11 to close the contact, and the reading may then be made on the instrument I.

The spring held roller 53, in dropping between the points of the star wheel, holds the star wheel in register with the indexing pins 59.

Then to close the circuit, the handle 10 is swung into the upright position, throwing the shaft 11 endwise against the tension of the spring 36 until the contacts 33—34 engage contacts such as 30—30, whereupon the resistance of the springs 38—38 is encountered.

As the springs 38—38 yield, the pins 33—34 have a slight rocking action which breaks any film on the surface of the cooperating parts and brings the terminals 33—34 firmly into engagement with the terminals 30—30 closing the circuit between the selected thermocouple and the instrument.

Thus the thermocouples may be connected to the instrument and readings taken from a central point with rapidity and facility.

Due to lifting of the movable contacts clear of the stationary contacts no cross connection between contacts can occur. This makes the switch valuable for conditions where a wiping contact could not be used, as for example, in measuring voltages in circuits of considerable potential and other uses.

While I have shown two sets of contacts 30—30, it is to be understood that one terminal of each of the thermocouples may be connected to a common terminal, for example, the ring terminal 60, as shown in Fig. 10. In this case there are twelve individual contacts 61 and the common contact 60, so that twelve circuits may be connected by the selector switch. In this case the spring 38 is mounted in a radial position to bring its pin 33 above the row of contacts 61, and the spring 62 is arranged around the edge of the movable plate 64 which corresponds to the plate 35, as shown in Fig. 5, so as to bring the contact pin 65 diametrically opposite the contact pin 33 and yet over the ring contact 60.

It is to be observed that the flexible spiral rivet 43 permits not only the rotary motion which is required, but also the axial motion which is required.

In the form shown in Fig. 10, the indexing mechanism will permit of substantially a complete revolution, only one of the points being long enough to form a stop.

There is no inherent limitation on the number of selectable contacts that may be employed.

I do not intend to be limited to the details shown and described, except as the same are specifically included in the claims.

I claim:—

1. In a selector switch, a group of relatively stationary contacts arranged in the arc of a circle, a shaft having a rotary motion and axial motion, a selector contact carried by the shaft normally out of contact with the stationary contacts, indexing means including a star wheel on said shaft and cooperating movable and stationary pins for locking the shaft in position to register the selector contact with any predetermined one of said stationary contacts, and means to move the shaft axially to cause abutting engagement of the selector contact with the predetermined stationary contact.

2. In a selector switch, a plurality of relatively stationary contacts, a movable selector contact normally out of engagement with the stationary contacts, a support for the selector contact movable in one path to bring the selector contact into register with the selected one of said stationary contacts, means for moving the support in another path to bring the movable contact into abutting relation to the selected contact, the selected stationary contact limiting the movement of the movable contact in its second path, and means to lock the support against motion in said one path after it enters the second path.

3. In a selector switch, a supporting frame, a shaft supported therein for rotary and axial motion, a plurality of relatively stationary contacts arranged in the arc of a circle about said shaft, a selector member carried by the shaft for closing a circuit through any predetermined one of said relatively stationary contacts, indexing means including a star wheel on the shaft and a spring roller cooperating therewith for registering the shaft in predetermined position, and a cam lever for moving the shaft rotarily to select the predetermined stationary contacts, said lever being pivoted to the shaft for moving it axially to cause the selector member to close the circuit of the desired stationary contact.

4. In combination with a plurality of thermal responsive elements, a common indicating instrument, and circuits for said elements terminating in contacts, of a selector switch embodying said contacts, said contacts being arranged in the arc of a circle, a rotatable shaft, a selector contact carried by said shaft and adapted to lie at the same radial distance from the shaft as said first named contact, spring means for the selector contact, and indexing mechanism for the shaft for registering the selector contact with the stationary contacts, means for moving the shaft endwise to bring the selector contact into engagement with the first-named contact, said indexing means locking the shaft against rotary motion when it is moved endwise.

5. In combination, a shaft, a group of contacts arranged in a common radius about the shaft, a selector contact carried by the shaft normally out of engagement with the stationary contacts, means for registering the selector contact with the stationary contacts one at a time, and indexing means including a star wheel on the shaft for locking the shaft against rotary motion when the shaft is moved endwise, said locking mechanism being effective before the selector contact engages the stationary contact.

6. In combination, a pair of frame plates, one of said plates carrying a plurality of contacts in insulated relation, a shaft having bearings in said plates, said shaft having rotary motion and axial motion, a selector contact normally carried out of engagement with the stationary contacts, and a common handle on the shaft for rotating the same to bring the selector contact into register with one of said stationary contacts and for moving the shaft endwise to bring the selector contact into engagement with the selected one of the stationary contacts, said handle including cam means for moving the shaft endwise and then locking it.

7. In combination, a shaft, a carrier of insulation mounted on one end of the shaft, a group of stationary contacts arranged in a circle about the shaft, a selector contact carried on the carrier member, a flat spring connecting the contact to the carrier member, said selector contact having a slight angular motion when it engages the selected stationary contact while bending of the flat spring, and means on said shaft engaged by pins flexibly mounted with respect to said stationary contacts for holding the selector contact squarely on the selected contact against the tension of said flat spring.

8. In combination, a frame member, a shaft projecting through the frame member, a circular series of contacts disposed on the frame member about the shaft, a plate of insulating material carried on the end of the shaft, said plate forming a carrier for a selector contact, a selector contact comprising a pin projecting through said plate, a spring secured at one end to the plate and at the other end to the selector contact, a spiral conducting ribbon, a bracket connecting the inner end of the ribbon to the spring, and the bracket mounted on the frame plate and connected to the outer end of the spiral ribbon.

9. In combination, a base plate having an indicating instrument mounted thereupon, a cover member for the instrument, said cover member cooperating with the base plate, a pair of sockets mounted on the base plate, a bushing in the cover, a selector switch having a frame, bolts projecting from the frame and extending into said sockets and having a shaft projecting through said bushing.

10. In combination, a frame, a circular group of stationary contacts, a selector contact carried by the frame normally out of contact with the stationary contacts, a shaft projecting through the frame and carrying said selector contact, a handle pivoted to the shaft, said handle having a cam-shaped extension for moving the shaft endwise on motion of the handle about its pivot to bring the selector contact into engagement with the stationary contact and for locking it in engagement therewith, and indexing means for registering the selector contact with any one of the predetermined stationary contacts, said means including indexing pins on the side of the frame opposite the side where the handle is mounted for locking the shaft against rotary motion while the contacts are engaged.

11. In combination, a frame, a plurality of stationary contacts arranged in a circular group on the frame, a shaft centrally of said group mounted in the frame, a selector contact carried by the shaft normally out of engagement with the stationary contacts, a star wheel mounted on the shaft, a spring pressed roller having limited motion for engaging the star wheel to cause registration of the selector contact with any one of the stationary contacts, and means on the shaft for rotating the same and for moving the shaft axially to bring the selector contact into abutting relation with the selected one of the stationary contacts.

12. In combination, a frame having a group of stationary contacts arranged in the arc of a circle, a shaft arranged in the center of the group, a selector contact carried by the shaft and adapted to register with the stationary contacts individually, a star wheel mounted on the shaft, a spring pressed roller mounted on the frame and adapted to engage the star wheel to register the selector contact with a predetermined one of the stationary contacts, means to rotate the shaft to bring the selector contact into register with a predetermined one of the stationary contacts, means to move the shaft axially, and indexing pins adapted to enter between the points of the star wheel when the shaft is moved axially.

13. In combination, an electrical indicating instrument, a base plate for supporting instrument, a cover for the instrument, said cover having a flange cooperating with the base plate, said cover having a bushing, said bushing having a projecting margin forming a chart having indications thereupon, a switch mounted within the cover and having an operating shaft movable axially and rotarily projecting through the bushing, a handle pivoted on the end of the shaft outside of the cover, a pointer connected to the shaft, said handle adapted to be disposed substantially at right angles to the shaft for rotating the shaft to bring the pointer into alignment with the points on the card, and having cam means adapted to be actuated by pivotal motion of the handle on the shaft to move the shaft endwise to close the circuit of the instrument through said switch.

14. In a switch of the class described, a pair of frame plates, posts connecting the frame plates, a circular row of contacts, a shaft extending through the frame plates and disposed centrally of said stationary contacts, a selector contact carried by the shaft, said shaft having rotary and axial motion, a star wheel on the shaft, spring means mounted on one of the plates and extending towards the other plate, a pin mounted on the spring and extending through the other frame plate, said latter frame plate having a slot for receiving the pin, and a roller on the pin adapted to drop between the points of the star wheel.

In witness whereof, I hereunto subscribe my name this 29 day of November, 1927.

JOHN A. OBERMAIER.